(12) United States Patent
Jackson

(10) Patent No.: US 7,788,896 B2  
(45) Date of Patent: Sep. 7, 2010

(54) SCREW SHAFT TURBINE COMPRESSOR

(76) Inventor: John Jackson, 7987 S. Sandshury St., Littleton, CO (US) 80128

( * ) Notice: Subject to any disclaimer, the term of this patent is extended or adjusted under 35 U.S.C. 154(b) by 505 days.

(21) Appl. No.: 11/774,418

(22) Filed: Jul. 6, 2007

(65) Prior Publication Data

US 2009/0007539 A1    Jan. 8, 2009

(51) Int. Cl.
- *F02C 3/02* (2006.01)
- *F02C 3/04* (2006.01)
- *B63H 1/16* (2006.01)

(52) U.S. Cl. ............... 60/39.45; 60/39.43; 416/177

(58) Field of Classification Search ............ 60/39.43, 60/39.45, 726, 805; 415/72, 74, 75; 416/177  
See application file for complete search history.

(56) References Cited

U.S. PATENT DOCUMENTS 2,645,412 A * 7/1953 Sens .................... 417/247  
3,932,988 A * 1/1976 Beaufrere ............... 60/737

* cited by examiner

*Primary Examiner*—Michael Cuff  
*Assistant Examiner*—Young Choi  
(74) *Attorney, Agent, or Firm*—Leyendecker & Lemire, LLC; Kurt P. Leyendecker

(57) ABSTRACT

A screw shaft turbine compressor comprising (i) a compressor section, (ii) a turbine section, (iii) a combustion section coupling to the compressor section and the turbine section, and (iv) a grooved shaft. The grooved shaft in one embodiment extends from a portion of the compressor section, through the combustion section, and to a portion of the turbine section.

3 Claims, 3 Drawing Sheets

SCREW SHAFT TURBINE COMPRESSOR

FIELD OF THE INVENTION

This invention generally relates to compressor turbines.

BACKGROUND OF THE INVENTION

Compressor turbines are combustion rotary engines. Although combustion turbine engines come in various designs, each engine is defined by a compressor section adapted to increase the pressure on the air or air-fuel mixture, a combustion chamber which ignites the compressed mixture, and a coupled turbine portion. The energy released from the combustion chamber spins the turbine portion, which, in turn, powers and rotates the compressor section.

Turbine-compressor combustion engines were first patented in England in the late $18^{th}$ century. However, it wasn't until the $20^{th}$ century that turbines were developed which could be used to operate useful machinery. Particularly, axial-flow turbine compressors, where compressed fluid or gas flows generally parallel an axis of rotation, began to be developed and used in the aircraft industry during the 1940's. By the 1950's every major aircraft engine developer had moved to an axial-flow engine type.

Modern-day compressor turbines incorporate the use of blades to rotate and compress the fluid or gas. A typical axial compressor has a shaft which looks like a fan with blades, likely contoured, which are followed by a set of stationary blades, also known as stators. The blades may help increase efficiency of compressor designs. Additionally, axial compressors have a general conical shape, widest at the inlet, to compress the fluid or gas towards the combustion chamber.

The problem with many current turbine-compressor engines is that they are unreliable. Complex blade orientation design create increased breakdown opportunities, especially when the engines run at high output rates. Many of these maintenance problems cause safety hazards, either during repair or upon failure. Additionally, the fuel efficiency of many of these turbine engines, even with the use of fans, is uneconomical for many applications.

DETAILED DESCRIPTION

Figure 1:
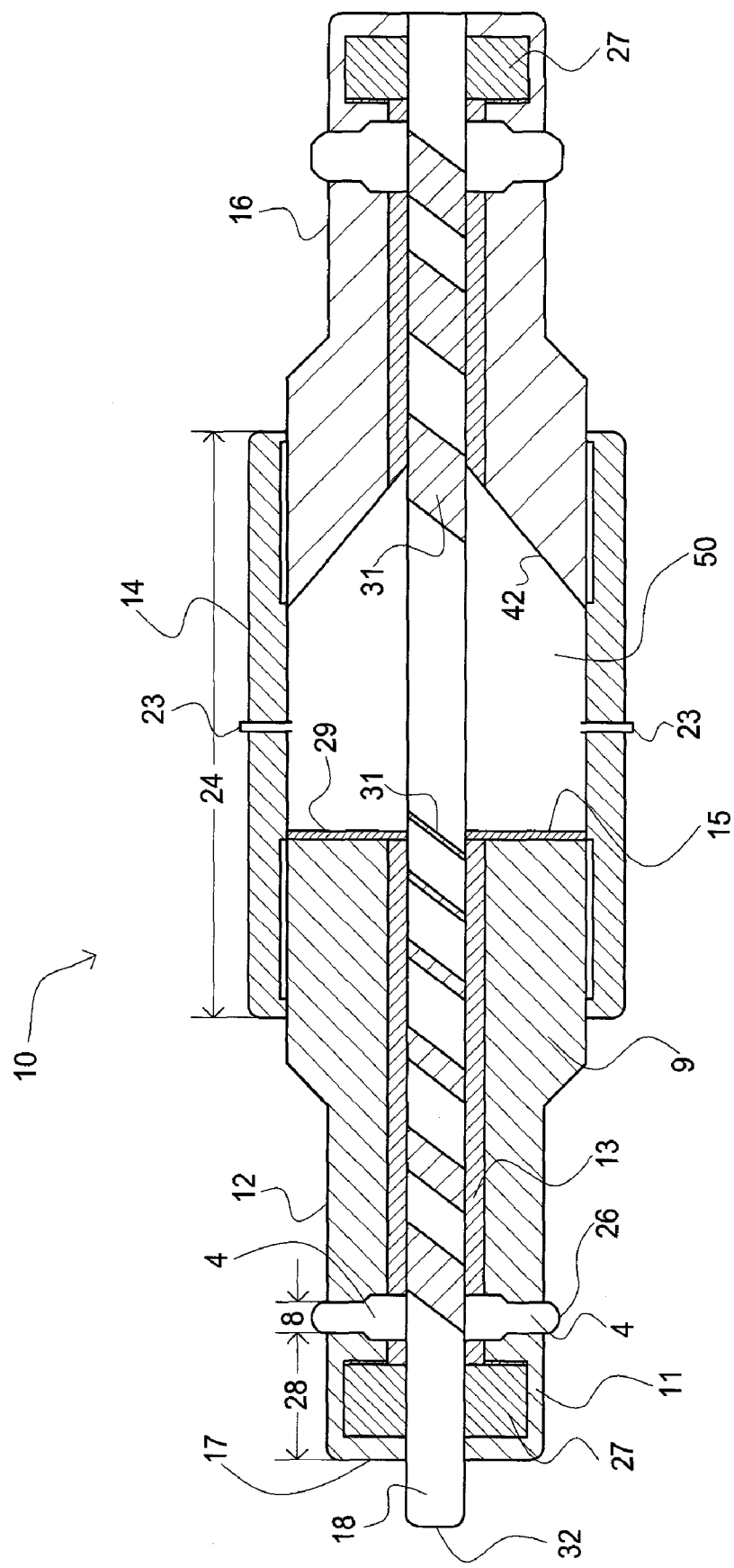
FIG. 1 is a side cut-away view of a screw shaft turbine compressor according to one embodiment of the present invention.

One embodiment of a screw shaft turbine compressor offers potentially greater reliability than prior art turbine compressors as the embodiment does not incorporate the use of blades to compress and direct fluid flow. Instead, the embodiment relies on a grooved shaft to direct and compress fluid flow. In addition to the grooved shaft, the embodiment is comprised of three sections: a compressor section, a combustion section, and a turbine section. However, a version is also contemplated that includes blades, also known as fins.

The combustion section in one embodiment is a hollow cylinder having at least one ignition device. The combustion section material has high yield strength, with one embodiment's material being steel or a steel alloy. One end of the combustion section cylinder is adapted to couple to the compressor section and one end is adapted to couple to the turbine section. An embodiment may employ threaded sections to enable coupling, or may employ another coupling mechanism. The ignition device may be a spark plug and composite materials may also be used as applicable.

Coupled to a first end of the combustion section of one embodiment is the compressor section. In one embodiment where the inner surface of a cylindrical combustion cylinder is threaded, the compressor section is also cylindrically-shaped and has threads on the outer surface of a portion of a distal end of the section. The compressor section outer surface threads are substantially adapted to mate with the combustion section inner surface threads. Also in one embodiment, the diameter of the compressor section distal end is larger than the diameter of a compressor section proximal end.

The compressor section is also comprised of a bore whose longitudinal axis is substantially parallel with the longitudinal axis of the compressor section. The center of the bore is substantially aligned with the center of the outer surface of the distal end and the outer surface of the proximal end of the compressor section. The outer surface of each end is generally parallel to each other and perpendicular the compressor section's longitudinal axis. Encircling the bore may be a ceramic or steel bush, also known as a bushing. Included in the compressor section in one embodiment is an inlet port. The inlet port is adapted to receive a substance such as, but not limited to, fuel, air, or a fuel-air mixture, and introduce the substance to the bore.

In one embodiment, the turbine section is generally a mirror-image of the compressor section. For example, the proximal end of the turbine section is coupled to the combustion section through threads substantially similar to the compressor section's distal end threads. Additionally, the turbine section proximal end has a diameter greater than the distal end. The turbine section bore is also substantially similar to the compressor section bore.

One difference between the compressor section to the turbine section is that one turbine section proximal end outer surface is generally not parallel to the turbine section distal end outer surface—nor is the proximal end outer surface generally perpendicular to the longitudinal axis of a turbine section bore. Although the distal end outer surface is generally parallel to the longitudinal axis of the turbine section, the proximal end outer surface is angled towards the distal end, ending in the bore generally located in the center of the surface. Therefore, the proximal end of the turbine section is generally conically-shaped with the bore located at the cone apex. One other difference between the turbine section and the compressor section is that the turbine section has an exhaust port instead of an intake port. The exhaust port may be adapted to allow gas to be released from the bore.

The shaft is typically placed in through the compressor section, coupled combustion section and turbine section bores. In addition to the bush-lined bores, the shaft may be supported in one embodiment with bearings. At least one bearing may be located within the compressor section and at least one bearing may be located in the turbine section. The shaft has at least one spiraled or helically-shaped groove on its surface. The groove in one embodiment spirals from a location proximal the compressor section intake port and ends at a location proximal the edge of the compressor section's distal end. In one embodiment, the groove width is adapted to decrease as the distance towards the compressor section distal end decreases.

Terminology:

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "composite", "composites" or any version thereof refers to a solid material which is composed of two or more substances having different physical characteristics and in which each substance retains its identity while contributing desirable properties to the whole.

Figure 2:
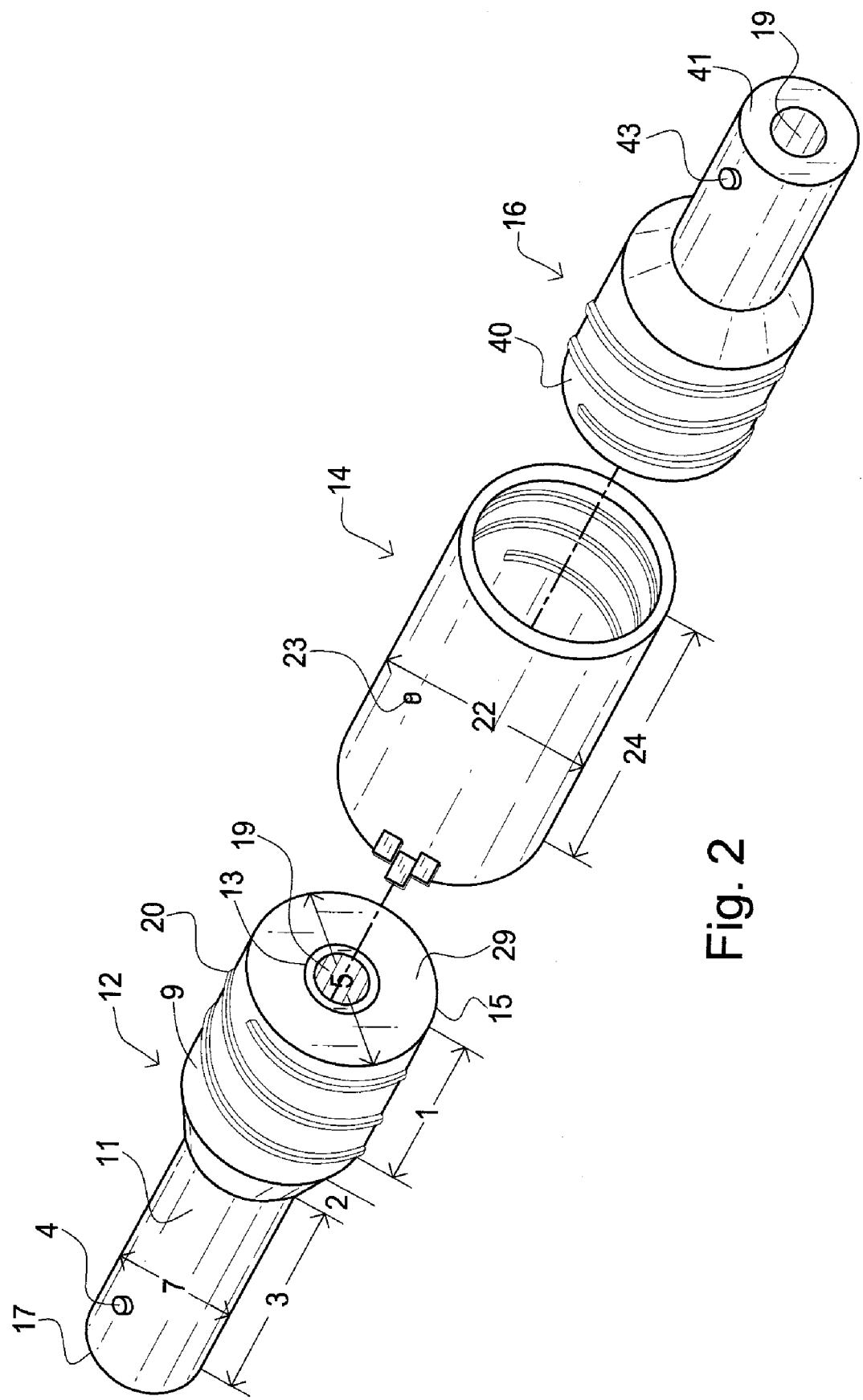
FIG. 2 is an isometric view of a compressor section, a combustion section and a turbine section of a screw shaft turbine compressor without a screw shaft according to one embodiment of the present invention.
Figure 3:
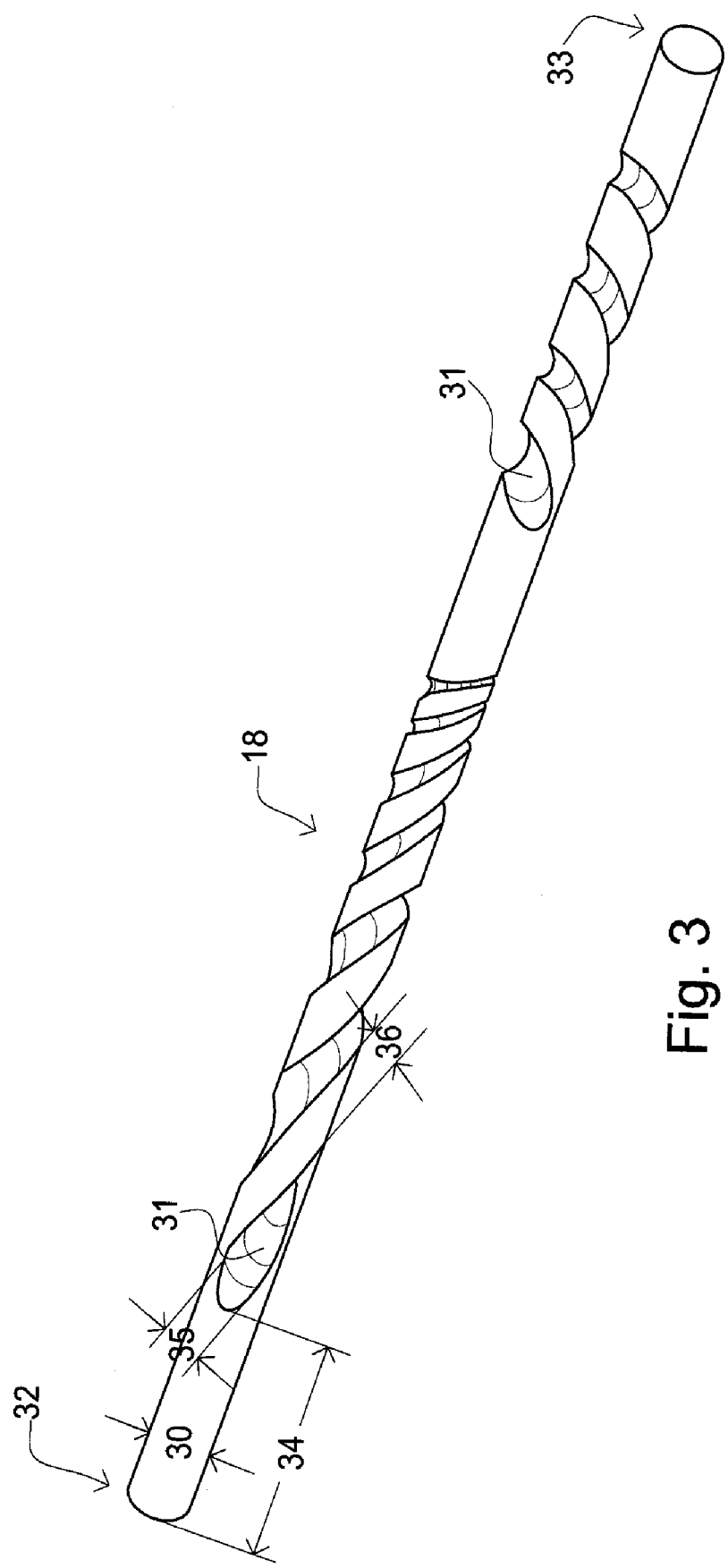
FIG. 3 is an isometric view of a screw shaft according to one embodiment of the present invention.

First Embodiment of a Screw Shaft Turbine Compressor:

Referring to FIGS. 1, 2, and 3, an embodiment of a screw shaft turbine compressor is shown. In one embodiment, the screw shaft turbine compressor 10 is comprised of 3 sections—a compressor section 12, a combustion section 14, and a turbine section 16. The screw shaft turbine compressor also includes a shaft 18. As best shown in FIG. 2, three sections are generally cylindrically-shaped with generally circular cross-sections. Other embodiments may have only two sections or may have non circular cross-sections as applicable.

In one embodiment, the sections are adapted to couple to each other. For example, as best shown in FIG. 2, a portion of the compressor section 12 may be comprised of a thread 20 which is adapted to mate with a threaded portion of the combustion section 14. Similarly, the combustion section may be adapted to couple with the turbine section through a set of threads adapted to mate with each other. It may be the ends of the combustion section cylinder that have the threads. Upon coupling the turbine section and compressor section to the combustion section, a combustion chamber 50 is created, as best shown in FIG. 1. One side of the combustion chamber may be comprised of the compressor section, one side of the combustion chamber may be comprised of the turbine section, and at least one combustion chamber wall may be comprised of the combustion section.

Another embodiment may be unitary in nature, such as, an embodiment having three integrated sections. Yet one embodiment may also have three sections that are coupled through means other than mating threads. Additionally, one embodiment may be comprised of only two sections or more than three sections. The two sections may be integrated or may be adapted to couple to each other. Upon coupling, the two sections may comprise a combustion chamber 50.

In a three section embodiment having a combustion section, the combustion section may have an outside diameter 22 of 8 inches and a length 24 of 6 inches. Embodiments are contemplated that have larger and smaller combustion sections, depending on the application. The combustion section is typically comprised of a material which is adapted to withstand the heat and pressure that occurs during turbine operation. For example, one combustion section may be comprised of steel or a steel alloy. Other materials, such as, but not limited to, composite materials may be used as well in an embodiment.

Included in the combustion section 14 in one embodiment is at least one ignition device 23. One embodiment is comprised of two ignition devices, as best shown in FIG. 1. The ignition device may be a device, such as, but not limited to, a spark plug, which is adapted to create an arc of electrical current between two electrodes. The arc of current creates a spark which ignites a fuel mixture in the combustion section.

In an embodiment having a combustion section 14 coupled to the compressor section 12 and the turbine section 16, fuel may enter the combustion chamber 50 through a bore 19 located in the compressor section, as best shown in FIGS. 2 and 1. The bore may extend from a compressor section proximal end 17 to a compressor section distal end 15. The longitudinal axis of the bore is generally perpendicular to the compressor section proximal and distal ends in one embodiment. Additionally, the center of the bore is generally aligned with the center of the proximal and distal ends of the compressor section in one embodiment.

Surrounding the bore 19 in the compressor section 12 in one embodiment is a bushing 13. An embodiment's bushing may not completely encircle the bore, but in one embodiment substantially surrounds the bore. The bushing may be comprised of ceramic or hardened steel. Other bushing materials are contemplated. The bushing is generally adapted to strengthen the bore. The compressor section may be comprised of a steel alloy or any other material which may be similar to the material the combustion section is comprised of.

In one embodiment, the compressor section 12 is comprised of two portions. An embodiment's first portion 11 has a first portion diameter 7 which is smaller than the diameter 5 of the second portion 9. In one compression section embodiment, the diameter increases from the first portion to the second portion in a generally linear manner and along an increasing diameter portion of the compressor section.

The length 3 of a first portion 11 may be about 4 inches and one first portion diameter may be about 4 inches. The length of one second portion 9 may be about 4 inches and a diameter of a second portion may be about 6 inches. In an embodiment, one length 2 of the increased diameter portion is less than the length or the diameter of the first portion or the second portion. One version may have an increased diameter portion length of 1 inch.

Included in one first portion 11 of a version is at least one inlet port 4. A version may also include two inlet ports, as best shown in FIG. 1, with one inlet port bore entrance 6 opposing the other inlet port bore entrance. The inlet ports are adapted to allow air, fuel, an air-fuel mixture, or any other substance to pass through the port and into the bore 19. The longitudinal axis of the inlet ports of one embodiment are generally perpendicularly aligned with the longitudinal axis of the compressor section first portion and the bore. One inlet port may have a generally circular cross-sectional geometry, with a diameter 8 of the inlet port 4 varying over the inlet port length, as best shown in FIG. 4. The inlet port diameter in one embodiment may be larger at a bore entrance 6 than at an outer surface inlet port opening 26. One inlet port may include a device such as, but not limited to, a nozzle, adapted to release fluid into the bore. The inlet port distance 28 from the compressor section's proximal end 17 in one embodiment may be equal to about 2 inches.

Included in the compressor section 12 in one embodiment may be a support mechanism such as, but not limited to, a rotatably adapted support mechanism. One rotatably adapted support mechanism may be a bearing 27. The bearing is adapted to permit radial motion between the shaft 18 and the compressor section and may provide support to the shaft. One embodiment may use ball bearings as the bearing. Other bearings may also be used such, but not limited to, jewel bearings, fluid bearings, magnetic bearings, and flexure bearings. Fluid bearings may be gas bearings, hydrostatic bearings, hydrodynamic bearings, foil bearings, or journal bearings. Other radially adapted support mechanisms may be used.

The shaft 18 in one version is a cylindrical rod. The rod may have a generally circular cross-section. One shaft comprises a diameter 30 adapted to fit in the bore 19 in the compressor and turbine sections, as best shown in FIG. 1. In one embodiment, the shaft diameter may be about 2 inches. One shaft version has an outer surface upon which there is at least one groove 31, as best shown in FIG. 3. In one embodiment, the groove may be a spiraled or helical groove. The groove may spiral from a shaft proximal end 32 towards a shaft distal end 33. In one embodiment, the groove begins at a distance 34 from the proximal end, with one version's start distance being about 2 inches. In one embodiment, the beginning of the groove opposes the inlet port bore entrance 6, as best shown in FIG. 1. One version may have more than one groove.

To compress the mixture in one embodiment, the width 35 of the groove 31 in one embodiment decreases as the distance from the proximal end 32 of the shaft 18 increases. An ungrooved distance 36 between the grooves also decreases in one embodiment as the distance from the proximal end of the shaft increases, as best shown in FIGS. 1 and 3. The grooves may also be referred to as spirals. Other groove designs adapted to compress the mixture are also contemplated. For instance, the depth of the groove may vary along its length.

In one embodiment, the groove width 35 is less than the shaft diameter 30. A version's groove width at the groove start may be 1 inch. The proximal end 32 of the shaft in one embodiment may extend further than the proximal end 17 of the compressor section, upon the shaft being correctly placed in the compressor section, as best shown in FIG. 1. Therefore, the inlet port distance 28 in a version is less than the groove start distance 34. Upon coupling the combustion section 14 to the compressor section 12, the shaft 18 in one embodiment is adapted to extend at least from the proximal end 17 of the compressor section into the combustion chamber 50. The groove 31 in one embodiment ends after entering the combustion chamber.

However, in one embodiment, when the turbine section 16 is coupled to the combustion section 14, the shaft 18 may be a single shaft which extends through the combustion chamber 50 and into the bore 19 located in the turbine section. The groove on the shaft may begin anew at the point proximal the shaft entering a turbine section bore. The width of the groove in the turbine section may stay substantially stable throughout the turbine section, and the distance between the groove in the turbine section may stay substantially stable as well. However, the width and distance between the groves may vary as well.

One embodiment's turbine section 10 is substantially similar to the compressor section 12. However, the proximal end 40 of a turbine section may be coupled to the combustion section, whereas a distal end 15 of the compressor section may be coupled to the combustion section. Therefore, the turbine section may generally a mirror image of the compressor section, except for a conical surface, including bearings.

One difference between the compressor section and the turbine section is that the distal end surface 29 of the compressor section is generally perpendicular from the longitudinal axis of the bore 19, whereas the proximal end surface 42 of the turbine section is generally a conical surface angled towards the distal end 41 and the bore. Another difference is that the port 43 on the turbine section is not an inlet port, but is an exhaust port.

Operation of one embodiment allows for an air-fuel mixture to enter into the bore 19 of the compressor section 12 through at least one inlet port 4. As the fluid enters the bore, it is captured into the groove 31 on the shaft 19. As the shaft spins, the fluid travels towards the combustion chamber 50, being compressed in the process. Upon entering the combustion chamber, the fluid may be vaporized and ignited, with the combustion energy being directed on the shaft entering the turbine section, spinning the shaft, with the exhaust gas exiting out the exhaust port 43.

I claim:

1. A turbine compressor comprising;
    a compressor section comprising
        a proximal end,
        a distal end,
        a bore,
        a threaded hollow cylinder,
        a first end, the first end coupling to the compressor section,
        a second end, the second end coupling to a turbine section and
        an intake port adapted to receive a substance;
    the turbine section comprising
        a proximal end,
        a distal end,
        a bore and
        an exhaust port adapted to release a substance;
    a combustion section coupling to the compressor section and the turbine section, the combustion section having at least one ignition device,
    a grooved shaft extending from a portion of the compressor section through the combustion section with the grooved shaft (i) being rotatably coupled to the compressor section and the turbine section, (ii) having a support mechanism, and (iii) having a generally helically-shaped groove; and a bushing substantially surrounding the compressor section bore and the turbine section bore.

2. A turbine compressor comprising:
(i) a compressor section comprising
a proximal end,
a distal end,
a bore,
a threaded hollow cylinder,
a first end, the first end coupling to the compressor section,
a second end, the second end coupling to a turbine section and
an intake port adapted to receive a substance;
(ii) the turbine section comprising
a proximal end,
a distal end,
a bore and
an exhaust port adapted to release a substance;
(iii) a combustion section coupling to the compressor section and the turbine section, the combustion section having at least one ignition device;
(iv) a grooved shaft extending from a portion of the compressor section through the combustion section with the grooved shaft (1) being rotatably coupled to the compressor section and the turbine section, (2) having a support mechanism, and (3) having a generally helically-shaped groove, and to a portion of the turbine section; and
(v) a bushing substantially surrounding the compressor section bore and the turbine section bore;
wherein (a) a width of the helically-shaped groove is adapted to decrease as the distance towards a compressor section distal end decreases upon coupling the shaft to the compressor section, (b) the support mechanism comprises bearings and (c) the compressor section further comprises an increased diameter portion.

3. The turbine compressor of claim 1 wherein:
a width of the helically-shaped groove is adapted to decrease as the distance towards a compressor section distal end decreases upon coupling the shaft to the compressor section;
the support mechanism comprise bearings; and
the compressor section further comprises an increased diameter portion.

* * * * *